May 24, 1938.   G. I. WELSH   2,118,750
BELT CONNECTER
Filed Nov. 6, 1935
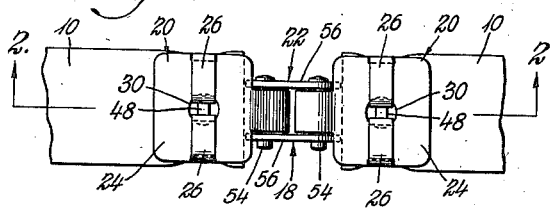
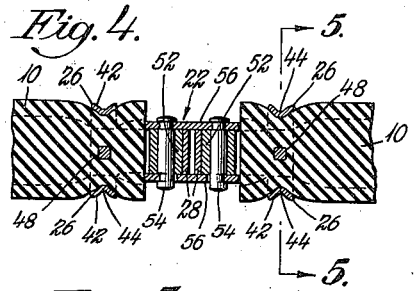
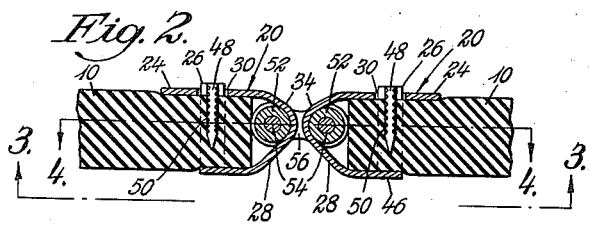
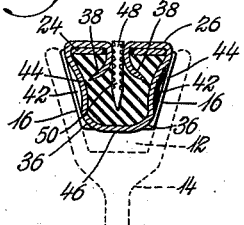
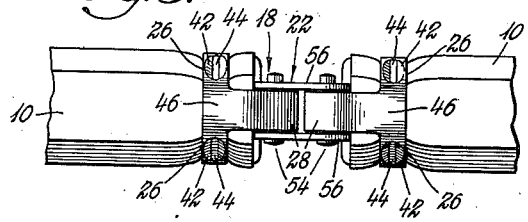
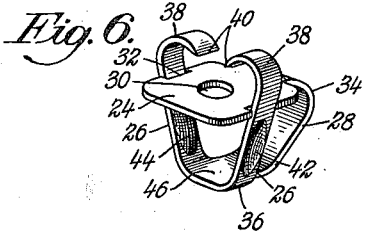
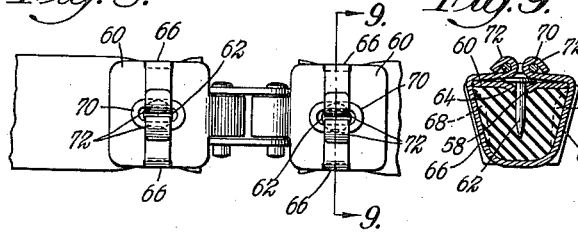
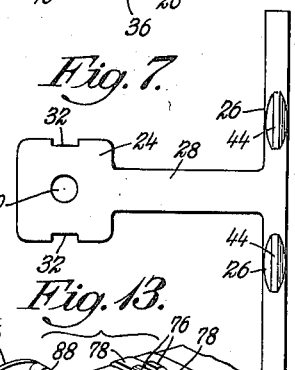
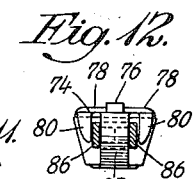
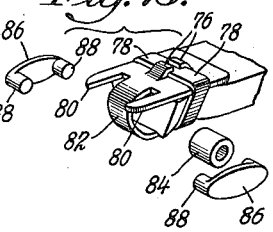
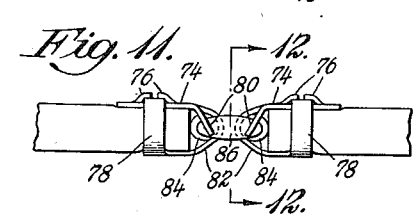
George I. Welsh
INVENTOR
BY Victor J. Evans & Co.
HIS ATTORNEYS Patented May 24, 1938

2,118,750

UNITED STATES PATENT OFFICE 2,118,750

BELT CONNECTER

George I. Welsh, Dixon, Ill.

Application November 6, 1935, Serial No. 48,596

2 Claims. (Cl. 24—33)

My invention relates to power transmission belts of the trapezoidal type, and has among its objects and advantages the provision of an improved belt connecter for heavy duty purposes.

In the accompanying drawing:

Fig. 1 is a top plan view of my connecter illustrating the relation between the connecter and the belt ends;

Fig. 2 is a sectional view along the line 2—2 of Fig. 1;

Fig. 3 is a bottom plan view of the structure illustrated in Fig. 1;

Fig. 4 is a sectional view along the line 4—4 of Fig. 2;

Fig. 5 is a sectional view along the line 5—5 of Fig. 2, showing the relation between the belt and coupler and the grooved wheel around which the belt runs;

Fig. 6 is a perspective view of one part of the coupler;

Fig. 7 is a plan view of the blank from which the part illustrated in Fig. 6 is formed;

Fig. 8 is a top plan view of a different form;

Fig. 9 is a sectional view taken along the line 9—9 of Fig. 8;

Fig. 10 is a top plan view of another form;

Fig. 11 is a side elevation of the coupler shown in Fig. 10;

Fig. 12 is a sectional view along the line 12—12 of Fig. 11; and

Fig. 13 is a perspective view of a portion of the coupler illustrated in Figs. 10 and 11.

In the embodiment selected to illustrate my invention, I make use of a belt 10 having a trapezoidal configuration in cross section and known in the trade as a V-belt. The belt is designed to operate within the groove 12 in a conventional sheave 14 and the sides 16 of the belt have wedging relation with the walls of the groove 12. I illustrate the ends of the belt as being connected by means of a connecter 18, which connecter is associated with the belt end in such a manner as to lie within the contour of the converging sides 16.

To each end of the belt 10 I connect an anchoring device 20 completely encircling the belt in cross section. These devices are movably related at 22 to permit flexing of the coupler proper. In Fig. 7, I have illustrated the blank from which the devices 20 are formed. The sheet metal of the device is shaped to provide a plate 24 connected with two straps 26 through the medium of a neck 28. The plate 24 is provided with a central opening 30 and recesses 32.

Fig. 6 illustrates the method of bending the blank illustrated in Fig. 7 preparatory to connection with the end of the belt. The neck 28 is bent to provide a curved part 34. The straps 26 are bent at 36 and the ends of the straps are curved as at 38 and sharpened at 40. In Figs. 6 and 7, the straps 26 are provided with deformations 42. These deformations provide ribs 44 arranged to be pressed into the sides of the belt for anchoring purposes.

In connecting the part illustrated in Figs. 6 and 7 with the end of the belt, the belt end is positioned between the straps 26, the plate 24, and the unbent area 46 defining the juncture of the straps 26 and the neck 28. After the belt end has been positioned, the straps 26 are pressed firmly against the sides of the belt end and the curved parts 38 of the straps are driven downwardly through the opening 30. In driving the ends 38 through the opening 30, the ends are imbedded in the material of the belt, as illustrated in Fig. 5.

At this time the straps 26 lie within the recesses 32 and the top and bottom surfaces of the belt are pressed firmly between the plate 24 and the area 46. After the ends 38 have been driven home, a pin 48 is driven between the bent ends 38. This pin is preferably rectangular in cross section, with a striated surface 50 which prevents accidental shifting of the pin. In driving the pin home, I force the straps 26 against the edge of the plate 24 defining the opening 30. Forced separation of the straps because of the pin 48 causes the straps to bite into the edge of the opening 30 so as to firmly anchor the straps. In some cases it may be desirable to separate the straps through the aid of a punch before the pin 48 is driven in. A firm bite is attained between the edge of the opening 30 and the straps 26 because of forcing the flat straps to conform generally to the shape of the opening 30.

Referring to Figs. 1 and 3, it will be noted that the plate 24 is narrower than the top surface of the belt, and that the straps 26 are bent along lines within the contour of the bottom surface of the belt. A suitable die may be employed for pressing the straps firmly against the sides of the belt simultaneously with the driving of the ends 38 through the opening 30. The straps are depressed into the sides of the belt sufficiently far to lie within the contour thereof. In this way, I eliminate metal-to-metal contact between the coupler and the sheave 14.

After the parts 20 have been connected with the belt ends, the parts are movably connected through the medium of two sleeves 52 of anti-friction material. These sleeves are mounted upon pins 54, which pins have their ends passing through links 56. The ends of the pins may be deformed to prevent endwise shifting. The sleeves 52 are loosely mounted upon the pin 54, while the bend 34 in the neck 28 conforms to the curvature of the sleeve 52 associated therewith. With the coupler positioned according to Fig. 2, a line drawn through the axes of the pins 54 conforms generally to the neutral axis of the belt.

My coupler is firmly connected with the belt ends because of the ends 38, which are anchored in the material of the belt, and the ribs 44. Heretofore attempts have been made to anchor pins, bolts, and rivets in the material of V-belts, but such devices have been unsuccessful in connection with heavy duty belts. The pins, bolts, or rivets have caused separation of the material of the belt. My invention prevents separation of the belt material in that the coupler part 20 completely encircles the belt and prevents any separation thereof. The straps 26 and the ribs 44 are pressed into the material of the sides of the belt, but these parts do not cause any fracture of the material of the belt.

My construction is noiseless in that there is no contact between the metallic coupler and the sheave. The two parts 20 are hingedly connected together so as to bend easily when the belt is passing from its straight or curved phase. In belts of the V-type, the material of the wide side is placed under an additional tension when passing around the sheave, which tension tends to elongate this part of the belt, while the narrow side is placed under compression. I find that the parts 20 provide accommodation for this variation to the end that a smooth running coupler is attained. The anti-friction sleeves 52 will last the normal life of the belt and require no oiling.

In Figs. 8 and 9, I illustrate a slightly different construction in which the opening 58 in the plate 60 is of smaller diameter than the opening 30. A nail 62 is driven into the opening. This nail is of slightly larger diameter than the opening 58 which tends to deform the material surrounding the opening as at 64. One edge of each of the straps 66 corresponding to the straps 26 is provided with a lip 68 bent at right angles to the strap. This lip corresponds to the rib 44. The ends of the straps 66 are passed through a flattened ring 70 and bent around the ring as at 72. The straps bear against the head of the nail 62 to prevent shifting of the nail while the ring 70 provides an effective coupler element for the straps.

In Figs. 10 to 13, inclusive, I illustrate another form in which the plate 74 is severed to provide ears 76 which are offset out of the plane of the plate and bent over the ends of the straps 78. The plate 74 includes two fingers 80 which are arranged in spaced relation with the curved part 82 conforming to the curvature 34. Within the curved part 82 I position an anti-friction sleeve 84 which has a length equal to the width of the curved part. A link 86 is positioned adjacent each end of the curved part 82, after which the fingers 80 are bent downwardly to prevent separation of the link from the curved part. Each link includes two shaft parts 88. These parts are positioned within the sleeves 84 and are held firmly therein because of the fingers 80. The ends of the shaft 88 are arranged substantially in abutting relation with the fingers of the other link. All the parts are connected together by merely bending the fingers 80 to the position illustrated in Fig. 11.

Without further elaboration, the foregoing will so fully explain my invention that others may, by applying current knowledge, readily adapt the same for use under various conditions of service.

I claim:

1. In a power transmission belt, a coupler element comprising a plate having an opening, two straps and a neck connecting the straps with the plate, said neck being bent to provide a curved anchorage for a bearing, said straps being bent to project the ends through said opening, said ends being anchored in the material of the belt, and a spreader driven between the ends passing through said opening.

2. In a power transmission belt of the V-type, a coupler element comprising an originally T-shaped strap, one reach of said strap being provided with an opening and bent back upon itself to bear against two opposite sides of the belt, the bend in the said one reach extending beyond the end of the belt to provide anchorage for a connecting link, the other two reaches of said coupler element being arranged at right angles to the said one reach and bent to embrace two opposite sides of the belt, the ends of the said other reaches being bent and passed through said opening and imbedded in the material of the belt, and a separator driven between the portions of the said other reaches imbedded in the belt.

GEORGE I. WELSH.